United States Patent
Jiang et al.

(10) Patent No.: US 11,041,424 B2
(45) Date of Patent: Jun. 22, 2021

(54) METHOD AND SYSTEM FOR OPERATING A GASEOUS FUEL VEHICLE

(71) Applicant: Ford Global Technologies, LLC, Dearborn, MI (US)

(72) Inventors: Zhen Jiang, Mountain View, CA (US); Dominique Meroux, Fair Oaks, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 15/927,944

(22) Filed: Mar. 21, 2018

(65) Prior Publication Data

US 2019/0292973 A1   Sep. 26, 2019

(51) Int. Cl.
| | |
|---|---|
| *B60L 58/27* | (2019.01) |
| *F01P 3/20* | (2006.01) |
| *F02M 21/02* | (2006.01) |
| *F01P 3/18* | (2006.01) |
| *F01P 5/12* | (2006.01) |

(Continued)

(52) U.S. Cl.
CPC ....... *F01P 3/20* (2013.01); *B60K 6/24* (2013.01); *B60L 58/27* (2019.02); *F01P 3/18* (2013.01); *F01P 3/22* (2013.01); *F01P 5/12* (2013.01); *F01P 7/14* (2013.01); *F02M 21/0221* (2013.01);

(Continued)

(58) Field of Classification Search
CPC .. E01P 3/20; B60L 58/27; B60L 58/33; B60K 6/24; B60K 15/03504; B60K 2015/03052; B60K 11/02; B60K 15/03006; F01P 3/22; F01P 5/12; F01P 7/14; F01P 3/20; F01P 2003/005; F01P 2025/30; F01P 3/00; F01P 5/10; F01P 2050/24; F01P 2060/00; F01P 7/167; F02M 21/0221; B60Y 2200/92; B60Y 2200/91; B60Y 2300/91; B60Y 2306/05; Y01S 903/903; Y02T 10/36; Y02T 10/32; Y02T 10/7005; Y02T 10/705; Y02T 10/121; Y02T 10/44; Y02T 50/56; B01J 19/0013; F02D 41/0027; B64D 37/02; H01M 10/625; H01M 10/6567; H01M 10/613; H01M 8/0432;

(Continued)

(56) References Cited

U.S. PATENT DOCUMENTS

| | | | |
|---|---|---|---|
| 7,377,294 B2 | 5/2008 | Handa | |
| 7,398,745 B1 * | 7/2008 | White | F01P 5/14 |
| | | | 123/41.01 |

(Continued)

FOREIGN PATENT DOCUMENTS

EP    2167864 B1    10/2011

OTHER PUBLICATIONS

Li et al., Design of the security alarm control system for LNG-fueled vessels, 2017, IEEE, p. 426-431 (Year: 2017).*

(Continued)

*Primary Examiner* — McDieunel Marc
(74) *Attorney, Agent, or Firm* — David Kelley; McCoy Russell LLP

(57) ABSTRACT

Methods and systems for operating a vehicle that includes an internal combustion engine and a gaseous fuel storage tank are presented. In one example, the gaseous fuel storage tank is cooled so that an amount of gaseous fuel that may be stored in the gaseous fuel tank may be increased to extend a vehicle's driving range.

17 Claims, 7 Drawing Sheets

(51) Int. Cl.
    *F01P 3/22*           (2006.01)
    *B60K 6/24*           (2007.10)
    *F01P 7/14*           (2006.01)

(52) U.S. Cl.
    CPC ........ *B60Y 2200/92* (2013.01); *Y10S 903/903* (2013.01)

(58) Field of Classification Search
    CPC ... H01M 8/04768; B60W 20/00; B60W 10/08
    See application file for complete search history.

(56) References Cited

U.S. PATENT DOCUMENTS

| | | | | |
|---|---|---|---|---|
| 9,115,635 | B2* | 8/2015 | Abou-Nasr | F01P 7/162 |
| 9,488,132 | B2* | 11/2016 | Khanapure | F02M 21/023 |
| 10,150,571 | B2* | 12/2018 | Cordatos | B64D 37/32 |
| 2008/0302504 | A1 | 12/2008 | Handa | |
| 2013/0055728 | A1* | 3/2013 | Lurken | B60H 1/3202 62/7 |
| 2013/0228151 | A1* | 9/2013 | Dunn | F02M 21/0209 123/294 |
| 2014/0283764 | A1* | 9/2014 | Abou-Nasr | F01P 7/162 123/41.02 |
| 2015/0101704 | A1* | 4/2015 | Leone | B67D 7/0478 141/5 |
| 2015/0233627 | A1* | 8/2015 | Ragazzi | B60H 1/00921 62/82 |
| 2015/0345436 | A1* | 12/2015 | Yang | F02M 25/0854 123/519 |
| 2016/0032868 | A1* | 2/2016 | Khanapure | F02M 21/023 60/323 |
| 2016/0059690 | A1* | 3/2016 | Wildgrube | F17C 5/06 180/69.5 |
| 2018/0066618 | A1* | 3/2018 | Engfehr | F02B 29/0493 |
| 2018/0128139 | A1* | 5/2018 | Conti | F01N 3/0842 |
| 2018/0328260 | A1* | 11/2018 | Steiner | F01P 3/18 |
| 2018/0372337 | A1* | 12/2018 | Walker | F01K 3/18 |

OTHER PUBLICATIONS

Guoying et al., Structural design of skid-mounted fueling station for LNG vehicles, 2011, IEEE, p. 1971-1975 (Year: 2011).*

Curtis, Fuel Systems Design and Maintenance, 2011, IEEE, 125-148 (Year: 2011).*

Jurgen, Automotive electronics: Drivers get more options in 1983: Car makers embrace electronics in an all-out drive to improve performance, handling, fuel economy, riding quality, driver aids, and entertainment, 1982, IEEE, p. 30-36 (Year: 1982).*

"CNG Vehicle Fueling Animation," U.S. Department of Energy—Energy Efficiency and Renewable Energy Website, Available Online at https://www.afdc.energy.gov/vehicles/cng_tank_animation.html, Available as Early as Nov. 14, 2014, 1 page.

"CNG Vehicle Fueling Animation Text Version," U.S. Department of Energy—Energy Efficiency and Renewable Energy Website, Available Online at https://www.afdc.energy.gov/vehicles/cng_tank_animation_text.html, Available as Early as Sep. 10, 2015, 4 pages.

"Reliable Temperature Compensation is Critical to CNG Vehicle Safety," U.S. Department of Energy—Energy Efficiency and Renewable Energy Website, Available Online at https://www.afdc.energy.gov/bulletins/2014_09_18_CNG_Temp.html, Available as Early as Oct. 18, 2014, 1 page.

* cited by examiner

METHOD AND SYSTEM FOR OPERATING A GASEOUS FUEL VEHICLE

FIELD

The present description relates to methods and a system for storing and consuming gaseous fuel in a wheeled vehicle. The methods and system may be particularly useful for vehicles that include hybrid powertrains.

BACKGROUND AND SUMMARY

A vehicle may include an internal combustion engine to provide propulsive torque to the vehicle and to charge an electric energy storage device (e.g., a battery or a capacitor). The engine may combust a fuel (e.g., hydrogen, liquefied petroleum gas, or compressed natural gas and referred to herein as a gaseous fuel) that is in a gaseous state at a defined ambient temperature (e.g., 70° F.) and pressure (e.g., 14.7 pounds per square inch). The gaseous fuel may reduce engine emissions and improve engine starting during cold engine operating conditions, but the amount of gaseous fuel that may be stored onboard the vehicle may be limited based on environmental conditions. For example, a gaseous fuel tank may be rated to hold an amount of fuel equal to 20 gallons gasoline equivalent (GGE) of compressed natural gas at 70° Fahrenheit, which corresponds to a pressure of 3600 pounds per square inch (PSI). However, the same gaseous fuel tank may be filled with only 15 GGE of compressed natural gas at temperature that is higher than 70° F. because of the gaseous fuel tank's pressure limits and because filling stations may include filling devices that limit the amount of gaseous fuel that may be provided to a vehicle's fuel tank based on pressure in the fuel tank and ambient temperature. Thus, range of a gaseous fuel vehicle may be reduced because of fuel tank pressure constraints and ambient environmental conditions. As such, it may be desirable to provide a way of reducing variation of a gaseous fuel tank filling amount in view of varying environmental conditions so that a vehicle's driving range after filling the fuel tank to its capacity may be more consistent.

The inventors herein have recognized the above-mentioned disadvantage and have developed a vehicle system, comprising: a cooling circuit including a pump or compressor; a gaseous fuel storage tank in thermal communication with the cooling circuit; and a controller including executable instructions stored in non-transitory memory to cool the gaseous fuel tank via the cooling circuit in response to filling of the gaseous fuel tank.

By cooling the gaseous fuel storage tank in response to filling the gaseous fuel storage tank with fuel, it may be possible to provide more consistent GGE fuel amounts stored in gaseous fuel storage tank over a wider range of ambient environmental temperatures. For example, during filling of a gaseous fuel storage tank, compression work performed on gaseous fuel may increase a temperature of the gaseous fuel stored in the gaseous fuel storage tank and it may increase a temperature of the gaseous fuel storage tank. The temperature increases may act to reduce the amount of fuel that may be stored in the gaseous fuel storage tank because of gaseous fuel storage tank pressure limits. However, by cooling the gaseous fuel storage tank during filling of the gaseous fuel storage tank, it may be possible to reduce pressure within the gaseous fuel storage tank so that the GGE amount of fuel stored in the fuel tank may be increased without exceeding gaseous fuel tank pressure limits.

The present description may provide several advantages. For example, the approach may allow more consistent GGE amounts of fuel to be stored within a gaseous fuel storage tank. Further, the approach may allow a temperature of a battery to be increased via heat transferred from the gaseous fuel storage tank to the battery, thereby reducing consumption of energy from the battery. In addition, the approach may be implemented in a variety of ways including but not limited to via a heat pump or via a glycol cooling circuit.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an example, referred to herein as the Detailed Description, when taken alone or with reference to the drawings, where.

DETAILED DESCRIPTION

Figure 1A:
FIG. 1A is a schematic diagram of a vehicle.
Figure 2:
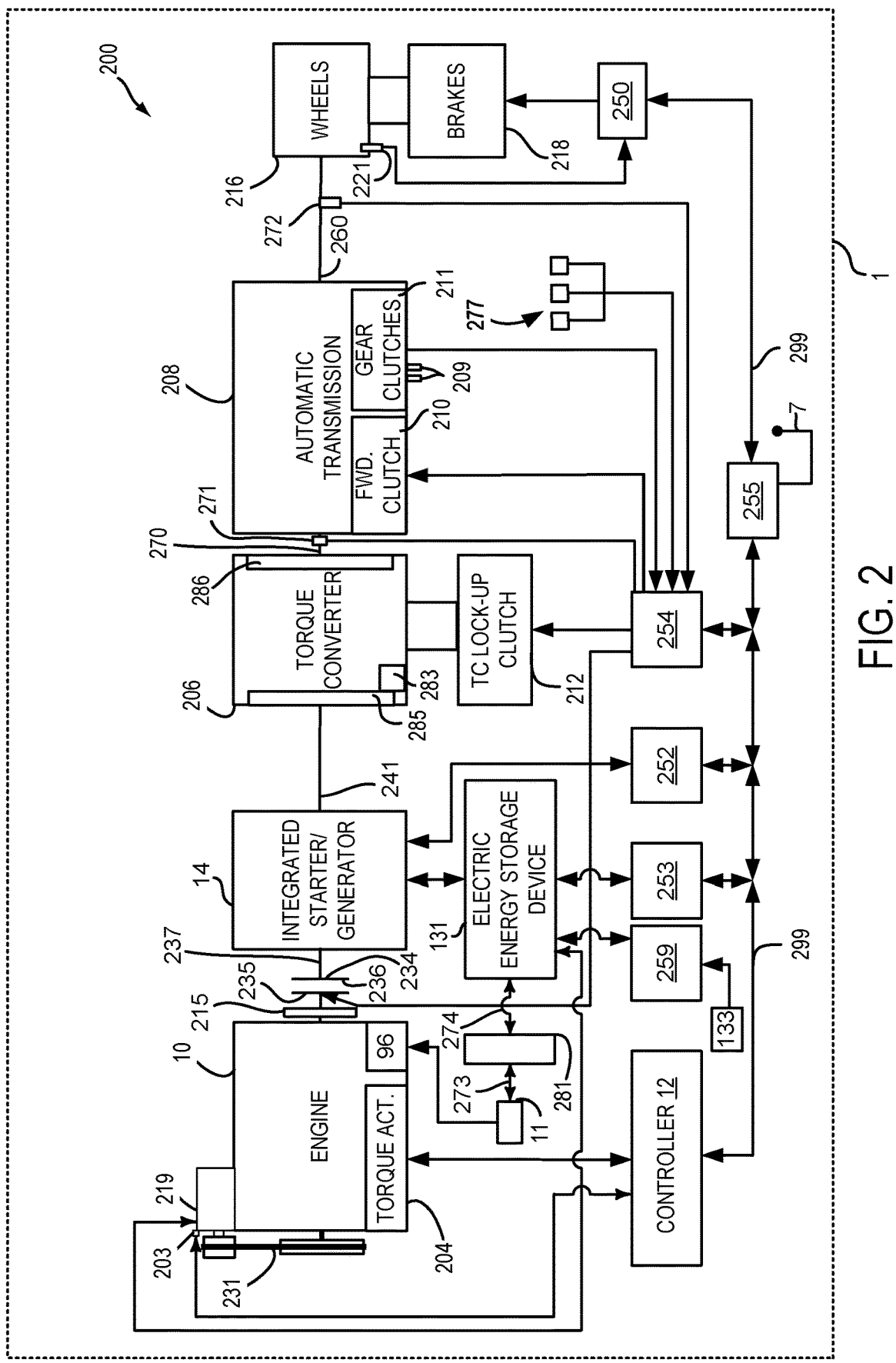
FIG. 2 is a schematic of a powertrain or driveline that includes the internal combustion engine shown in FIG. 1B.
Figure 3A:
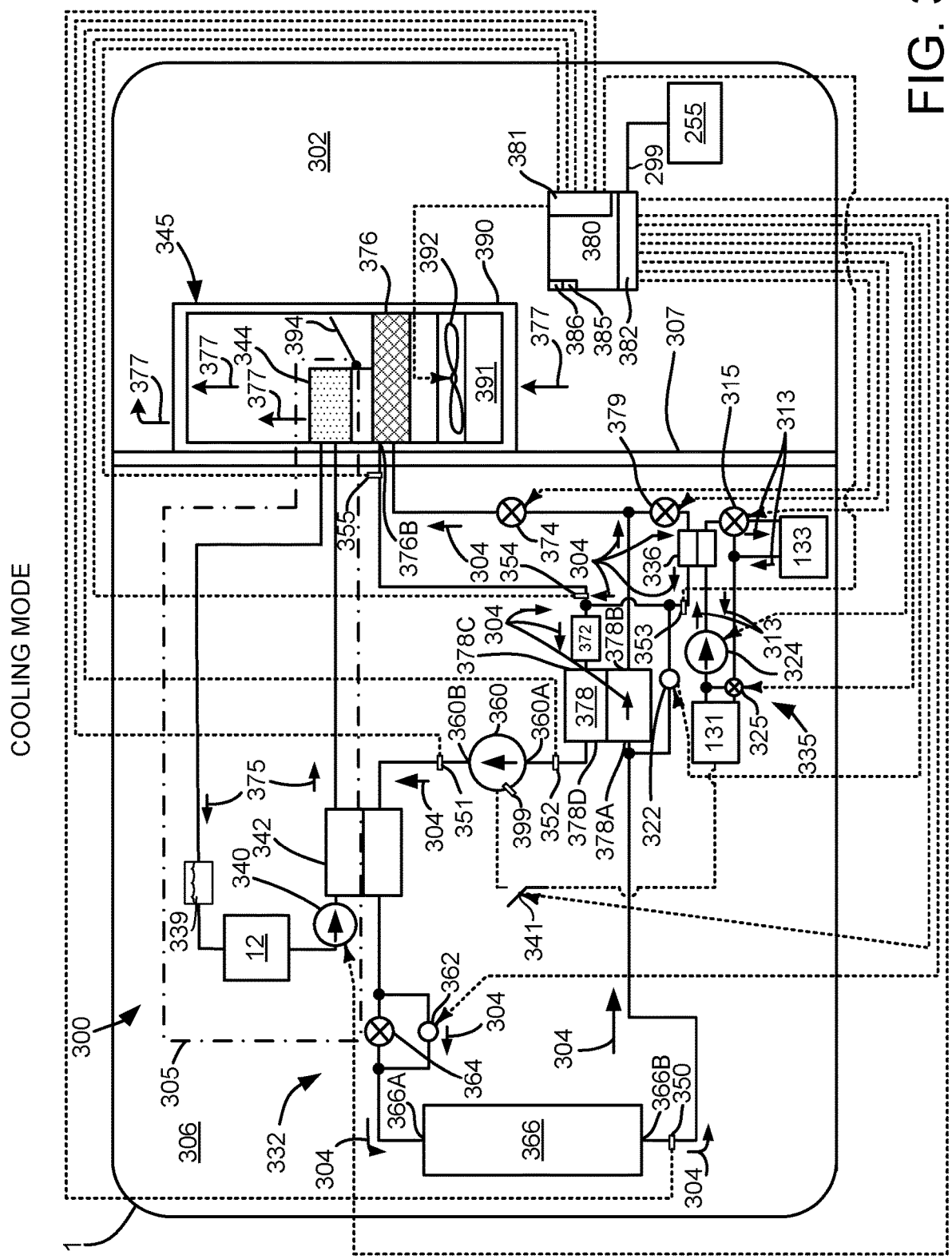
FIG. 3A is a schematic diagram of a heat pump that may cool a gaseous fuel storage tank.
Figure 3B:
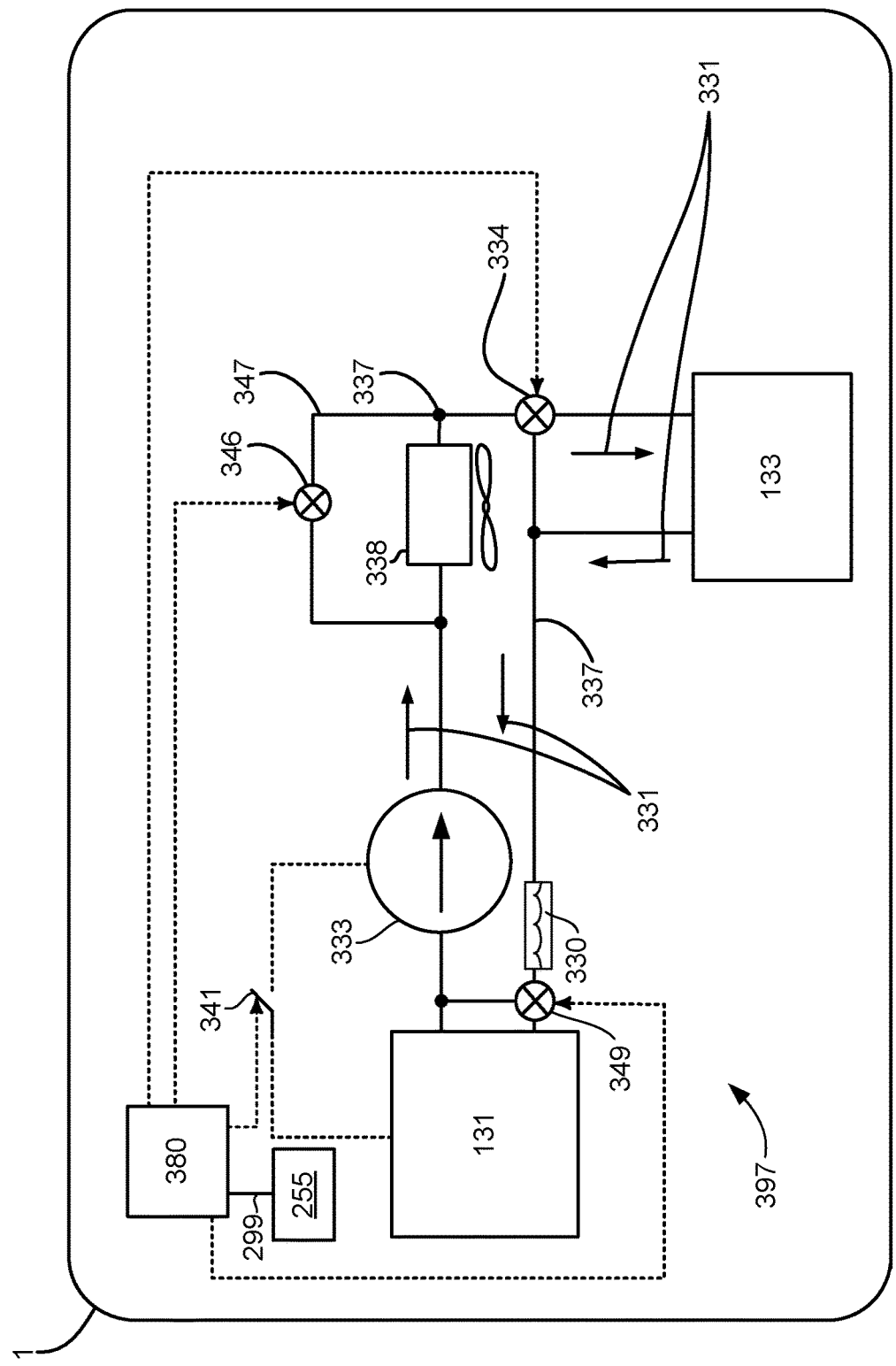
FIG. 3B is a schematic diagram of a glycol coolant circuit that may cool a gaseous fuel storage tank.

The present description is related to operating a vehicle that includes a gaseous fuel storage tank. The vehicle may include an internal combustion engine and an electric machine for propelling the vehicle as is shown in FIGS. 1A-2. The vehicle may include one or more cooling circuits for cooling the gaseous fuel tank as shown in FIGS. 3A and 3B. The vehicle may be operated according to the sequence of FIG. 4 and according to the method of FIG. 5.

Referring to FIG. 1A, a vehicle 1 including an engine 10, an electric machine 14, a first electrical energy storage device 11, and a second electrical energy storage device 131 is shown. In one example, the vehicle 1 may be propelled solely via the engine 10, solely via the electrical machine 14, or by both the engine 10 and the electrical machine 14. The electrical machine 14 may be supplied electrical power via the second electrical energy storage device 131. Thus, second electric energy storage device 131 may be referred to as a traction battery. The second electrical energy storage device 131 may be recharged via engine 10 providing power to electrical machine 14 and electrical machine 14 outputting electrical energy to second electric energy storage device 131. Alternatively, second electrical energy storage 131 device may be recharged via converting the vehicle's kinetic energy into electrical energy via electrical machine 14 during vehicle deceleration or hill descent. Second electrical energy storage device 113 may also be recharged from a stationary power grid via a home charging system or a remote charging system (e.g., a charging station). In one example, second electrical energy storage device 113 is a battery. Alternatively, second electrical energy storage device 113 may be a capacitor or other storage device. First electrical energy storage device 11 may be a low voltage battery for cranking the engine and operating vehicle electrical consumers (e.g., lights).

Vehicle 1 may be supplied with gaseous fuel via fuel filling station 5 when fuel nozzle 4 is inserted into gaseous fuel receiver 2. Nozzle sensor 3 may provide an indication to one or more controllers described herein to indicate that vehicle 1 is being filled with gaseous fuel. In addition, fuel filling station 5 may transmit fuel filling data to vehicle 1 via wireless transmitter 6. Vehicle 1 may receive the fuel filling data via wireless receiver 7. Alternatively, the fuel filling data may be transmitted from filling station 5 to vehicle 1 via a wire connection that is aboard nozzle 4. Fuel data may include whether the fuel fill is delivered in a fast fill mode or in a time fill mode. A time fill mode is where the gaseous fuel storage tank is filled directly from a compressor, not from a high pressure fuel storage tank. A fast fill mode is where the gaseous fuel storage tank is filled directly from a high pressure fuel storage tank. The fuel filling data may also include price of fuel and the total amount of fuel delivered during the present filling event.

Figure 1B:
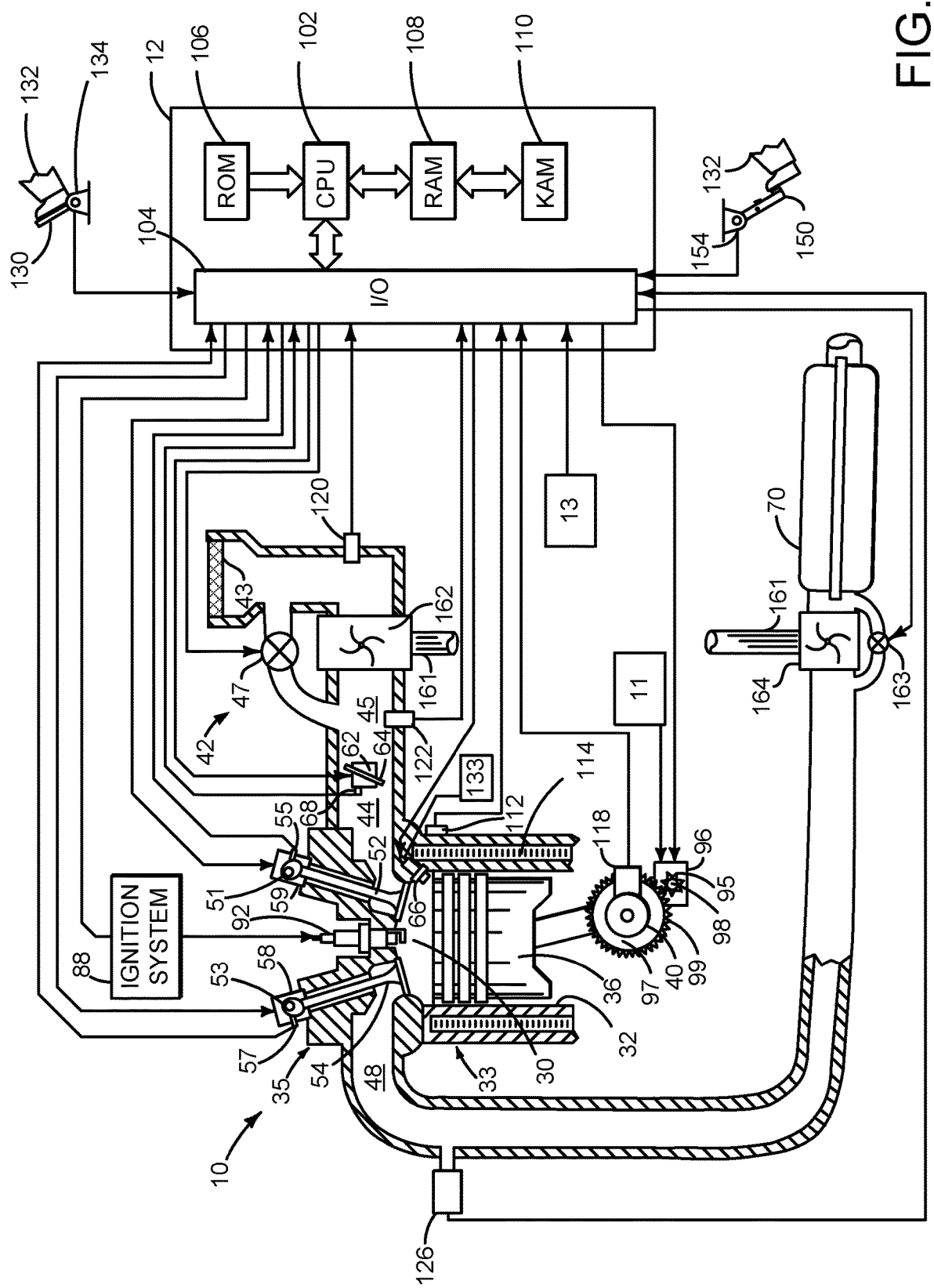
FIG. 1B is a schematic diagram of an internal combustion engine that is included in the vehicle of FIG. 1A.

Referring to FIG. 1B, internal combustion engine 10, comprising a plurality of cylinders, one cylinder of which is shown in FIG. 1B, is controlled by electronic engine controller 12. The controller 12 receives signals from the various sensors shown in FIG. 1B and employs the actuators shown in FIG. 1B to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Low voltage battery (e.g., 12 volts) 11 supplies electrical power to starter 96 so that engine 10 may be cranked (e.g., rotated via starter 96) during engine starting.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system including a gaseous fuel storage tank 133 and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1B as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 13. A request to start the engine or vehicle may be generated via a human and input to the human/ machine interface 13. The human/machine interface 13 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is provided merely as an example, and that intake and exhaust valve opening and/or closing timings may vary, such as to generate positive or negative valve overlap, late intake valve closing, or various other examples.

FIG. 2 is a block diagram of a vehicle 1 including a powertrain or driveline 200. The powertrain of FIG. 2 includes engine 10 shown in FIGS. 1A and 1B. Powertrain 200 is shown including vehicle system controller 255, engine controller 12, electric machine controller 252, transmission controller 254, energy storage device controller 253, and brake controller 250. The controllers may communicate over controller area network (CAN) 299. Further, vehicle system controller may receive data from receiver 7. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions. The various controllers shown in FIG. 2 may receive signals from the various sensors shown in FIG. 2 and the various controllers shown in FIG. 2 may provide signals to the various actuators shown in FIG. 2 to operate the vehicle.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 14. In other examples, engine 10 may be omitted. Engine 10 may be started with an engine starting system shown in FIG. 1B, via belt integrated starter/generator (BISG) 219, or via electric machine 14 also known as an integrated starter/generator (ISG). A speed of BISG 219 may be determined via optional BISG speed sensor 203. Electric machine 14 (e.g., high voltage (operated with greater than 30 volts) electrical machine) may also be referred to as a motor and/or generator. Further, torque of engine 10 may be adjusted via torque actuator 204, such as a fuel injector, throttle, etc.

BISG 219 is mechanically coupled to engine 10 via belt 231. BISG 219 may be coupled to crankshaft 40 or a camshaft (e.g., 51 or 53 of FIG. 1). BISG 219 may operate as a motor when supplied with electrical power via electric energy storage device 131 or low voltage battery 11. BISG 219 may operate as a generator supplying electrical power to electric energy storage device 131 or low voltage battery 11. Bi-directional DC/DC converter 281 may transfer electrical energy from a high voltage buss 274 to a low voltage buss 273 or vise-versa. Low voltage battery 11 is electrically coupled to low voltage buss 273. Electric energy storage device 131 is electrically coupled to high voltage buss 274. Low voltage battery 280 selectively supplies electrical energy to starter motor 96.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 14 may be operated to provide torque to powertrain 200 or to convert powertrain torque into electrical energy to be stored in electric energy storage device 131 in a regeneration mode. ISG 14 is in electrical communication with energy storage device 131. ISG 14 has a higher output torque capacity than starter 96 shown in FIG. 1B or BISG 219. Further, ISG 14 directly drives powertrain 200 or is directly driven by powertrain 200. There are no belts, gears, or chains to couple ISG 14 to powertrain 200. Rather, ISG 14 rotates at the same rate as powertrain 200. Electrical energy storage device 131 (e.g., high voltage battery or power source) may be a battery, capacitor, or inductor. Electrical energy storage device 131 may be charged via fuel cell 259 or ISG 14. Fuel cell 259 converts gaseous fuel from gaseous fuel storage tank 133 into electrical energy. Fuel cell 259 may be of the type described in U.S. Pat. No. 7,449,260 or other known variations, which are hereby fully incorporated by reference for all intents and purposes. In some variants, engine 10 may be omitted when fuel cell 259 is included to provide power to propel vehicle 1. The downstream side of ISG 14 is mechanically coupled to the impeller 285 of torque converter 206 via shaft 241. The upstream side of the ISG 14 is mechanically coupled to the disconnect clutch 236. ISG 14 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 14.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG or BISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 131, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 14 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 14 supplies a negative torque to transmission input shaft 270, but negative torque provided by ISG 14 may be limited by transmission controller 254 which outputs a transmission input shaft negative torque limit (e.g., not to be exceeded threshold value). Further, negative torque of ISG 14 may be limited (e.g., constrained to less than a threshold negative threshold torque) based on operating conditions of electric energy storage device 131, by vehicle system controller 255, or electric machine controller 252. Any portion of desired negative wheel torque that may not be provided by ISG 14 because of transmission or ISG limits may be allocated to friction brakes 218 so that the desired wheel torque is provided by a combination of negative wheel torque from friction brakes 218 and ISG 14.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 14 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1B directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Referring to FIG. 3A, a schematic representation of a vehicle 1 with a climate control system 300 and gaseous fuel storage tank cooling is shown. Flow direction arrows (e.g., 304) describe refrigerant flow in climate control system 300 when climate control system 300 is operated in a cooling mode. The vehicle 1 may have any suitable drivetrain and may include an engine 10 that may be used to propel the vehicle 1 and/or power vehicle components. The vehicle 1 may include a single engine 10 as is shown in FIGS. 1A and 1t may be configured as an internal combustion engine adapted to combust any suitable type of fuel, such as gasoline, diesel fuel, or hydrogen. As another option, vehicle 1 may be configured as a hybrid vehicle that may have a plurality of power sources, such as a non-electrical power source like an engine and an electrical power source as is shown in FIG. 2. The vehicle 1 may include a passenger compartment 302, an engine compartment 306, and a climate control system 300.

Devices and fluidic passages or conduits are shown as solid lines in FIGS. 3A and 3B. Electrical connections are shown as dashed lines in FIGS. 3A and 3B. In FIGS. 3A and 3B, coolant subsystem 305 is shown with an engine 10, but in some examples engine 10 may be omitted.

The passenger compartment 302 may be disposed inside the vehicle 1 and it may receive one or more occupants. A portion of the climate control system 300 may be disposed in the passenger compartment 302.

The engine compartment 306 may be disposed proximate the passenger compartment 302. An engine 10 and/or an electric machine 14 as well as a portion of the climate control system 300 may be disposed in the engine compartment 306. The engine compartment 306 may be separated from the passenger compartment 302 by a bulkhead 307.

An outlet side 360B of compressor 360 is directly coupled to an inlet side of intermediate heat exchanger 342 via a conduit. Controller 340 may supply current and voltage to adjust a speed of compressor 360. Compressor 360 may pressurize and circulate the refrigerant through the heat pump subsystem 332. The compressor 360 may be powered by electrical power source 131. Speed of compressor 360 may be determined via sensor 399 which may be electrically coupled to cooling system controller 380.

Intermediate heat exchanger 342 may facilitate the transfer of thermal energy between the coolant subsystem 305 and the heat pump subsystem 332. In particular, heat may be transferred from heat pump subsystem 332 to coolant subsystem 305. The intermediate heat exchanger 342 may be part of the coolant subsystem 305 and the heat pump subsystem 332, and it may facilitate the transfer of thermal energy from heat pump subsystem 332 to coolant subsystem 305 without mixing or exchanging the heat transfer fluids in the coolant subsystem 305 and heat pump sub systems 332.

Intermediate heat exchanger 342 is shown directly coupled to an inlet side of first control valve 362 and an inlet side of first expansion device 364, which may be a fixed area expansion device. The first expansion device 364 may be provided to change the pressure of the refrigerant. For instance, the first expansion device 364 may be a fixed area expansion device or variable position valve that may or may not be externally controlled. The first expansion device 364 may reduce the pressure of the refrigerant that passes through the first expansion device 364 from the intermediate heat exchanger 342 to the exterior heat exchanger 366. As such, high pressure refrigerant received from the intermediate heat exchanger 342 may exit the first expansion device 364 at a lower pressure and as a liquid and vapor mixture in a heating mode.

First control valve 362 may be selectively opened and closed via cooling system controller 380. When first control valve 362 is in an open position, it provides a path of least fluidic resistance to exterior heat exchanger 366 such that there is little pressure drop across fixed area expansion device 364. Outlet sides of fixed area expansion device 364 and first control valve 362 are shown directly coupled to an inlet side 366A of exterior heat exchanger 366. An outlet side 366B of exterior heat exchanger 366 is shown directly coupled to a first inlet side 378A of internal heat exchanger 378 and coupled to an inlet side of accumulator 372 via second control valve 322. The exterior heat exchanger 366 may be disposed outside the passenger compartment 302. In a cooling mode or air conditioning context, the exterior heat exchanger 366 may function as a condenser and may transfer heat to the surrounding environment to condense the refrigerant from a vapor to liquid. In a heating mode, the exterior heat exchanger 366 may function as an evaporator and may transfer heat from the surrounding environment to the refrigerant, thereby causing the refrigerant to vaporize. A first outlet side 378B of internal heat exchanger 378 is directly coupled to inlets of second expansion device 379 and third expansion valve 374.

Internal heat exchanger 378, may transfer thermal energy between refrigerant flowing through different regions of the heat pump subsystem 332. Internal heat exchanger 378 may be disposed outside the passenger compartment 302. In a cooling mode or air conditioning context, heat may be transferred from refrigerant that is routed from the exterior heat exchanger 366 to the interior heat exchanger 376 to refrigerant that is routed from the accumulator 372 to the compressor 360. In the heating mode, the internal heat exchanger 378 does not transfer thermal energy between such refrigerant flow paths since the second expansion device 374 is closed, thereby inhibiting the flow of refrigerant through a portion of the internal heat exchanger 378.

The second expansion device 374 may be disposed between and may be in fluid communication with the exterior heat exchanger 366 and the interior heat exchanger 376. The second expansion device 374 may have a similar configuration as the first expansion device 364 and may be provided to change the pressure of the refrigerant similar to the first expansion device 364. In addition, the second expansion device 374 may be closed to inhibit the flow of refrigerant. More specifically, the second expansion device 374 may be closed to inhibit the flow of refrigerant from the exterior heat exchanger 366 to the interior heat exchanger 376 in a heating mode.

An outlet side of second expansion device 374 is directly coupled to an inlet side of interior heat exchanger 376. And outlet side 376B of interior heat exchanger 376 is directly coupled to an inlet of accumulator 372. The interior heat exchanger 376 may be in fluid communication with the second expansion device 374. The interior heat exchanger 376 may be disposed inside the passenger compartment 302. In a cooling mode or air conditioning context, the interior heat exchanger 376 may function as an evaporator and may receive heat from air in the passenger compartment 302 to vaporize the refrigerant. Refrigerant exiting the interior heat exchanger 376 is directly routed to the accumulator 372. In the heating mode, refrigerant may not be routed to the interior heat exchanger 376 due to the closure of the second expansion device 374.

An outlet of accumulator 372 is directly coupled to second inlet 378C of internal heat exchanger 378. The accumulator 372 may act as a reservoir for storing any residual liquid refrigerant so that vapor refrigerant rather than liquid refrigerant may be provided to the compressor 360. The accumulator 372 may include a desiccant that absorbs small amounts of water moisture from the refrigerant. A second outlet 378D of internal heat exchanger 378 is directly coupled to inlet or suction side 360A of compressor 360.

An outlet side of second control valve 322 is directly coupled to an inlet of accumulator 372 and an outlet of battery chiller heat exchanger 336. An outlet side of third expansion valve 379 is directly coupled to an inlet side of battery chiller heat exchanger 336. An outlet side of battery chiller heat exchanger 336 is directly coupled to an inlet side of accumulator 372. Third expansion valve 374 may be a TXV with shutoff, a fixed area expansion device, or an electronic expansion valve (EXV). In this example, battery chiller expansion device 379 and expansion device 374 include shut-off valves for preventing flow through the respective valves.

Battery chiller loop 335 includes second electrical energy storage device 131, battery chiller pump 324, gaseous fuel storage tank 133, battery bypass valve 325, and battery chiller heat exchanger 336. Electrical energy storage device 131 may selectively supply electrical power to pump 324 via controller 380. In a first position, three-way battery bypass valve 325 directs coolant from tank 133 or valve 315 directly to pump 324, thereby bypassing electric energy storage device 131 to avoid heating or cooling of electric energy storage device 131. In a second position, three-way battery bypass valve 325 directs coolant from tank 133 or valve 315 directly to electric energy storage device 131, thereby allowing the heating or cooling of electric energy storage device 131. Heat from second electrical energy storage device 131 and gaseous fuel tank 133 may be rejected to refrigerant flowing through battery chiller heat exchanger 336. Thus, coolant in battery chiller loop 335 is fluidically isolated from refrigerant in heat pump subsystem 332. Further, heat may be extracted from gaseous fuel tank 133 and delivered to electric energy storage device 131 via activating pump 324 and closing battery chiller expansion device 379. In some examples, a bypass valve and passage by allow coolant to bypass battery chiller heat exchanger 336 when heat from gaseous fuel storage tank 133 is applied to heat electric energy storage device 131. Pump 324 may be supplied with electric power from electric energy storage device 131.

The climate control system 300 may circulate air and/or control or modify the temperature of air that is circulated in the passenger compartment 302. The climate control system 300 may include a coolant subsystem 305, a heat pump subsystem 332, and a ventilation subsystem 345. Coolant (e.g., glycol) 339 in coolant subsystem 305 is fluidically isolated from refrigerant in heat pump subsystem 332.

The coolant subsystem 305, which may also be referred to as a coolant loop, may circulate a fluid, such as glycol 339, to cool the engine 10 or electric machine (not shown). For example, waste heat that is generated by the engine 10 when the engine is running or operational may be transferred to the coolant and then circulated to one or more heat exchangers to transfer thermal energy from the coolant. In at least one example, the coolant subsystem 305 may include a coolant pump 340, an intermediate heat exchanger 342 that may be fluidly interconnected by conduits such as tubes, hoses, pipes, or the like. The coolant subsystem 305 may also include a radiator (not shown) that may be disposed in the engine compartment 306 for transferring thermal energy to the ambient air surrounding the engine 10.

The coolant pump 340 may circulate coolant through the coolant subsystem 305. The coolant pump 340 may be powered by an electrical power source. The coolant pump 340 may receive coolant from the engine 10 and circulate the coolant in a closed loop. For instance, when the climate control system 300 is in a heating mode, coolant may be routed from the coolant pump 340 to the intermediate heat exchanger 342 and then to the heater core 344 before returning to the engine 10 as represented by the arrowed lines 375.

The intermediate heat exchanger 342 may facilitate the transfer of thermal energy between the coolant subsystem 305 and the heat pump subsystem 332. The intermediate heat exchanger 342 may be part of the coolant subsystem 305 and the heat pump subsystem 332. The intermediate heat exchanger 342 may have any suitable configuration. For instance, the intermediate heat exchanger 342 may have a plate-fin, tube-fin, or tube-and-shell configuration that may facilitate the transfer of thermal energy without mixing the heat transfer fluids in the coolant subsystem 305 and heat pump subsystems 332. Heat may be transferred from the heat pump subsystem 332 to the coolant via the intermediate heat exchanger 342 when the climate control system 300 is in a heating mode.

The heater core 344 may transfer thermal energy from the coolant to air in the passenger compartment 302. The heater core 344 may be disposed in the passenger compartment 302 in the ventilation subsystem 345 and may have any suitable configuration. For example, the heater core 344 may have a plate-fin or tube-fin construction in one or more examples.

The heat pump subsystem 332 may transfer thermal energy to or from the passenger compartment 302 and to the coolant subsystem 305. In at least one example, the heat pump subsystem 332 may be configured as a vapor compression heat pump subsystem in which a fluid is circulated through the heat pump subsystem 332 to transfer thermal energy to or from the passenger compartment 302. The heat pump subsystem 332 may operate in various modes, including, but not limited to a cooling mode and a heating mode. In the cooling mode, the heat pump subsystem 332 may circulate a heat transfer fluid, which may be called a refrigerant, to transfer thermal energy from inside the passenger compartment 302 to outside the passenger compartment 302.

The ventilation subsystem 345 may circulate air in the passenger compartment 302 of the vehicle 1. In addition, airflow through the housing 390 and internal components is represented by the arrowed lines 377.

Figure 5:
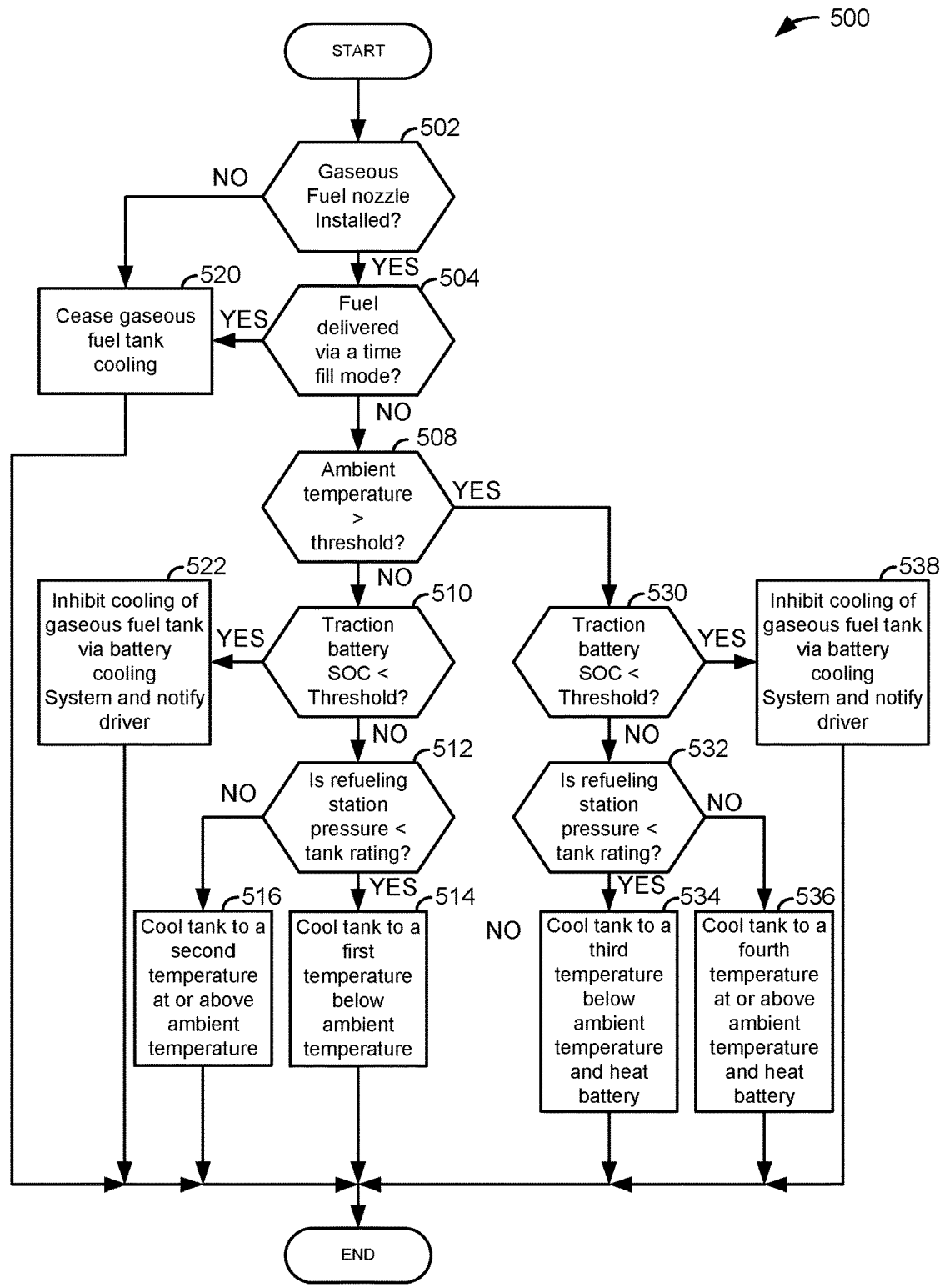
FIG. 5 shows a method for operating a vehicle including cooling a gaseous fuel tank during filling of the gaseous fuel tank.

Cooling system controller 380, vehicle system controller 255, and engine controller 12 shown in FIG. 1B include executable instructions of the methods in FIG. 5 to operate the actuators and sensors (e.g., valves, fans, and pumps or compressors) of the system shown in FIGS. 1A-3B. Cooling system controller 380 includes inputs 381 and outputs 382 to interface with devices in the system of FIGS. 1A-3B. Cooling system controller 380 also includes a central processing unit 385 and non-transitory memory 386 for executing the method of FIG. 5. Controller 380 may selectively provide electrical power from electrical energy storage device 131 to compressor 360 via switch 341.

Each of the devices shown in FIG. 3A that are fluidically coupled via conduits (e.g., solid lines) have an inlet and an outlet based on the direction of flow direction arrows 304, 375, and 313. Inlets of the devices are locations where the conduit enters the device in the direction of flow according to the flow direction arrows. Outlets of the devices are locations where the conduit exits the device in the direction of flow according to the flow direction arrows.

The system of FIG. 3A may be operated in a cooling mode. In cooling mode, passenger compartment 302 may be cooled. Further, gaseous fuel tank 133 and electric energy storage device 131 may be cooled. The cooling mode is activated by opening fixed first control valve 362, opening the shut-off valve of battery chiller expansion valve TXV 379 if battery chilling is desired, opening the shut-off valve of expansion device 374, closing second control valve 322, activating compressor 360, activating fan 392, and activating battery chiller pump 324. Three-way valve 315 may direct coolant to gaseous fuel tank 133 if cooling of gaseous fuel tank 133 is desired. Otherwise, three-way valve 315 may direct coolant flow to electric energy storage device 131.

During cooling mode, refrigerant flows through heat pump subsystem 332 in the direction of arrows 304. Coolant flows in battery chiller loop 335 in the direction indicated by arrows 313. Thus, in cooling mode, refrigerant exits compressor 360 and enters intermediate heat exchanger 342. The refrigerant then moves through the first control valve 362, thereby reducing flow through expansion device 364, so that the pressure loss across expansion device 364 is small. Refrigerant travels from the first control valve 362 to the exterior heat exchanger 366 which operates as a condenser. Condensed refrigerant then enters internal heat exchanger 378 where heat may be transferred from condensed refrigerant entering internal heat exchanger 378 from exterior heat exchanger 366 to vapor refrigerant entering internal heat exchanger 378 from interior heat exchanger 376. The liquid refrigerant then enters expansion device 374 and battery chiller expansion valve TXV 279 where it expands to provide cooling to passenger compartment 302 and battery chiller loop 335. Heat is transferred from coolant circulating in battery chiller loop 335 to refrigerant in heat pump subsystem 332 via battery chiller heat exchanger 336. Likewise, heat is transferred from passenger compartment 302 to refrigerant in heat pump subsystem 332 via interior heat exchanger 376. The heated refrigerant is directed to internal heat exchanger 378 before it is returned to compressor 360 to be recirculated.

The ventilation subsystem 345 may circulate air in the passenger compartment 302 of the vehicle 1. The ventilation subsystem 345 may have a housing 390, a blower 392, and a temperature door 394. The housing 390 may receive components of the ventilation subsystem 345. In FIG. 3A, the housing 390 is illustrated such that internal components are visible rather than hidden for clarity. In addition, airflow through the housing 390 and internal components is represented by the arrowed lines 377. The housing 390 may be at least partially disposed in the passenger compartment 302. For example, the housing 390 or a portion thereof may be disposed under an instrument panel of the vehicle 1. The housing 390 may have an air intake portion 391 that may receive air from outside the vehicle 1 and/or air from inside the passenger compartment 302. For example, the air intake portion 391 may receive ambient air from outside the vehicle 1 via an intake passage, duct, or opening that may be located in any suitable location, such as proximate a cowl, wheel well, or other vehicle body panel. The air intake portion 391 may also receive air from inside the passenger compartment 302 and recirculate such air through the ventilation subsystem 345. One or more doors or louvers may be provided to permit or inhibit air recirculation.

The blower 392 may be disposed in the housing 390. The blower 392, which may also be called a blower fan, may be disposed near the air intake portion 391 and may be configured as a centrifugal fan that may circulate air through the ventilation subsystem 345.

The temperature door 394 may be disposed between the interior heat exchanger 376 and the heater core 344. In the example shown, the temperature door 394 is disposed downstream of the interior heat exchanger 736 and upstream of the heater core 344. The temperature door 394 may block or permit airflow through the heater core 344 to help control the temperature of air in the passenger compartment 302. For instance, the temperature door 394 may permit airflow through the heater core 344 in the heating mode such that heat may be transferred from the coolant to air passing through the heater core 344. This heated air may then be provided to a plenum for distribution to ducts and vents or outlets located in the passenger compartment 302. The temperature door 394 may move between a plurality of positions to provide air having a desired temperature. In FIG. 3A, the temperature door 394 is shown in a full heat position in which airflow is directed through the heater core 344.

Temperature sensor 350 senses refrigerant temperature at outlet side 366B of exterior heat exchanger 366. Temperature sensor 350 may be located on a fin or tube of exterior heat exchanger 366. Alternatively, temperature sensor 350 may be located in a flow path of refrigerant in exterior heat exchanger 366. Pressure sensor 351 senses refrigerant pressure at outlet side 360B of compressor 360. Optional pressure sensor 352 senses refrigerant pressure at inlet side or suction side 360A of compressor 360. Pressure sensor 353 senses refrigerant pressure at an outlet side of battery chiller heat exchanger 336. Optional pressure sensor 354 senses refrigerant pressure at an inlet side of accumulator 372. Temperature sensor 355 senses refrigerant temperature an outlet side of interior heat exchanger 376. Temperature sensor 355 may be located on a fin or tube of interior heat exchanger 376. Alternatively, temperature sensor 355 may be located in a flow path of refrigerant in interior heat exchanger 376. Signals from temperature and pressure sensors 350-355 are input to cooling system controller 380.

Referring now to FIG. 3B, a second schematic representation of a vehicle 1 with a liquid to air heat exchanger battery coolant circuit 397 is shown. Coolant circuit 397 may also be referred to as a battery chiller loop. In this system, liquid coolant (e.g., glycol) 330 may be circulated in passages or conduits 337 between the various devices. Pump 333 is selectively provided with electrical power via cooling system controller 380, switch 341, and electric energy storage device 131. Pump 333 circulates liquid coolant 330 when pump 333 is supplied with electric power. Liquid coolant 330 may flow through electric energy storage device 131 to cool or heat electric energy storage device 131. Further, cooling and/or heating of electric energy storage device 131 may be avoided via bypass valve 349. In a first position, three-way battery bypass valve 349 directs coolant from tank 133 or valve 334 directly to pump 333, thereby bypassing battery 131 to avoid heating or cooling of battery 131. In a second position, three-way battery bypass valve 349 directs coolant from tank 133 or valve 334 directly to battery 131, thereby allowing the heating or cooling of battery 131. Coolant temperature may be reduced during a cooling mode by passing liquid coolant 330 through battery radiator 338, which rejects heat to ambient air. Alternatively, liquid coolant 330 may flow around battery radiator 338 via bypass valve 346 and bypass passage 347 in a heating mode when heat generated during filling of gaseous fuel tank 133 is used to heat electric energy storage device 131. In particular, bypass valve 346 may be commanded open during the heating mode or closed during the cooling mode. Liquid coolant 330 may also flow through gaseous fuel storage tank 133 when gaseous fuel storage tank 133 is being filled so that a larger amount of fuel may be stored in gaseous fuel storage tank 133. Three-way valve 334 may direct liquid coolant 330 from radiator 338 or bypass valve 346 and through gaseous fuel tank 133 in a first position as indicated by arrows 331. Three-way valve 334 may direct liquid coolant 330 from radiator 338 or bypass valve 346 and through electric energy storage device 131 bypassing gaseous fuel tank 133 in a second position. Controller 380 or system controller 255 may selectively open and close switch 341 to provide heating and/or cooling to electric energy storage device 131 and cooling to gaseous fuel storage tank 133.

Thus, the system of FIGS. 1A-3B provide for a vehicle system, comprising: a cooling circuit including a pump or compressor; a gaseous fuel storage tank in thermal communication with the cooling circuit; and a controller including executable instructions stored in non-transitory memory to cool the gaseous fuel tank via the cooling circuit in response to filling of the gaseous fuel tank. The vehicle system further comprises determining that the gaseous fuel tank is being filled via the controller. The vehicle system includes where the cooling circuit includes a heat pump. The vehicle system includes where the cooling circuit includes a radiator and a liquid coolant. The vehicle system further comprises an electric energy storage device that is selectively electrically coupled to the pump or compressor. The vehicle system further comprises an electric machine that provides propulsive torque to a vehicle, the electric machine in electrical communication with the electric energy storage device. The vehicle system includes where the cooling circuit is in thermal communication with the electric energy storage device. The vehicle system further comprises a three-way valve that is configured to pass coolant through a portion of the cooling circuit that cools the gaseous fuel tank and to bypass coolant around the portion of the cooling circuit that cools the gaseous fuel tank.

The system of FIGS. 1A-3B also provides for a vehicle system, comprising: a cooling circuit including a pump or compressor; a gaseous fuel tank in thermal communication with the cooling circuit; and a controller including executable instructions stored in non-transitory memory to cool the gaseous fuel tank via the cooling circuit below an ambient temperature in response to filling of the gaseous fuel tank when a filling station pressure is less than a rated pressure of the gaseous fuel tank. The vehicle system further comprises additional instructions to cool the gaseous fuel tank via the cooling circuit to a temperature not less than ambient temperature in response to filling the gaseous fuel tank when the filling station pressure is greater than the rated pressure of the gaseous fuel tank. The vehicle system further comprises a battery, the battery in selective electrical communication with the pump or compressor. The vehicle system further comprises additional instructions to activate the pump or compressor via electrical power provided by the battery. The vehicle system further comprises additional instructions to heat the battery via heat extracted from the gaseous fuel tank. The vehicle system further comprises a heat exchanger included in the cooling circuit. The vehicle system includes where the cooling circuit includes glycol coolant and further comprising a vapor compression heat pump that is in thermal communication with the cooling circuit.

Figure 4:
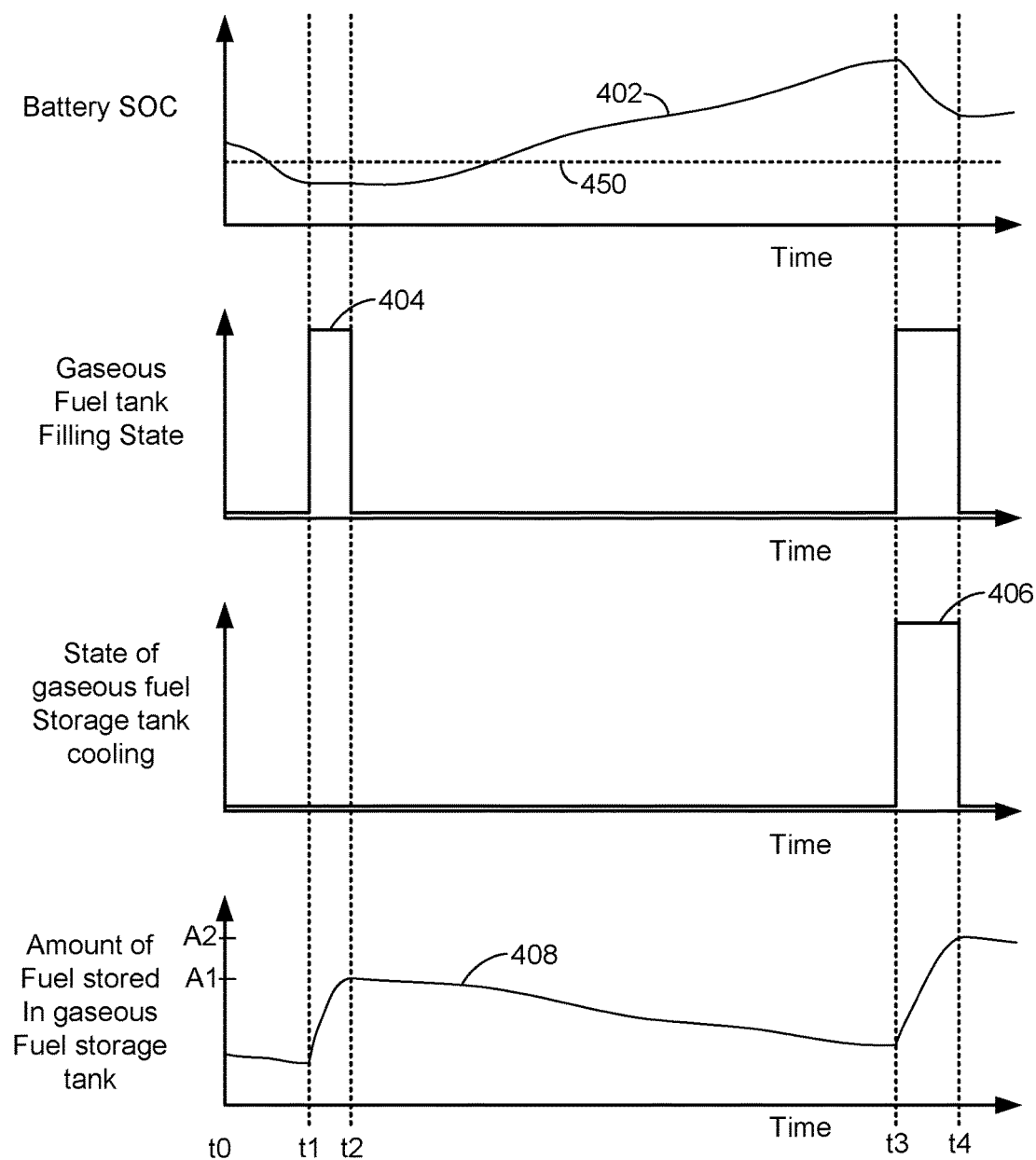
FIG. 4 shows an example gaseous fuel storage tank refilling sequence.

Referring now to FIG. 4, example plots of a vehicle operating sequence are shown. The operating sequence may be performed via the system of FIGS. 1A-3B in cooperation with the method of FIG. 5. Vertical lines at times t0-t4 represent times of interest during the sequence. The plots in FIG. 4 are time aligned and occur at the same time.

The first plot from the top of FIG. 4 is a plot of electric energy storage device or battery state of charge (SOC) versus time. The vertical axis represents battery SOC and the battery SOC increases in the direction of the vertical axis arrow. Trace 402 represents battery SOC. The horizontal axis represents time and time increases from the left side of the figure to the right side of the figure. Horizontal line 450 represents a threshold battery SOC. Cooling of a gaseous fuel storage tank is not performed when battery SOC is less than threshold 450. Cooling of the gaseous fuel storage tank may be performed when battery SOC is greater than threshold 450.

The second plot from the top of FIG. 4 is a plot gaseous fuel storage tank filling state versus time. The vertical axis represents the gaseous fuel filling state and the vehicle is being filled with gaseous fuel when trace 404 is at a higher level near the vertical axis arrow. The vehicle is not being filled with gaseous fuel when trace 404 is at a lower level near the horizontal axis. Trace 404 represents the gaseous fuel filling state. The horizontal axis represents time and time increases from the left side of the figure to the right side of the figure.

The third plot from the top of FIG. 4 is a plot of the state of gaseous fuel storage tank cooling versus time. The vertical axis represents state of gaseous fuel storage tank cooling and the state of gaseous fuel storage tank cooling indicates that the gaseous fuel storage tank is being cooled when trace 406 is at a higher level near the vertical axis arrow. The gaseous fuel storage tank is not being cooled when trace 406 is at a lower level near the horizontal axis. The horizontal axis represents time and time increases from the left side of the figure to the right side of the figure. Trace 406 represents the state of gaseous fuel storage tank cooling.

The fourth plot from the top of FIG. 4 is a plot of the amount of fuel stored in the gaseous fuel storage tank. The vertical axis represents the amount of gaseous fuel stored in the gaseous fuel storage tank and the amount of fuel stored in the gaseous fuel storage tank increases in the direction of the vertical axis arrow. The horizontal axis represents time and time increases from the left side of the figure to the right side of the figure. Trace 408 represents the amount of fuel stored in the gaseous fuel storage tank.

At time t0, the battery SOC is greater than threshold 450 and the gaseous fuel storage tank is not being filled. The state of gaseous fuel storage tank cooling indicates that the gaseous fuel storage tank is not being cooled. Between time t0 and time t1, the battery SOC falls to a level that is less than threshold 450.

At time t1, filling of the gaseous fuel storage tank begins. Filling of the gaseous fuel storage tank begins when the fuel nozzle is inserted into the fuel receiver. In one example, the gaseous fuel tank filling state is asserted when the gaseous fuel filling nozzle is inserted into the gaseous fuel receiver. However, because the battery SOC is less than threshold 450, there may be insufficient charge capacity within the battery (e.g., electric energy storage device 131 shown in FIGS. 3A and 3B) to provide electrical power to cool the gaseous fuel storage tank. Therefore, cooling of the gaseous fuel tank is not initiated and the amount of fuel stored in the gaseous fuel storage tank begins to increase.

Shortly before time t2, pressure in the gaseous fuel storage tank reaches a threshold pressure (not shown) and the fuel refilling station automatically ceases to supply fuel to the gaseous fuel storage tank. The amount of fuel stored in the gaseous fuel tank reaches a level of A1. The state of gaseous fuel storage tank cooling remains not asserted to indicate that the gaseous fuel storage tank is not being cooled. At time t2, the fuel filling nozzle is removed from the vehicle and the gaseous fuel storage tank filling state changes from a high level to a low level to indicate that the gaseous fuel storage tank is no longer being filled.

Between time t2 and time t3, the vehicle is driven and the vehicle's internal combustion engine consumes some of the fuel that is stored in the gaseous fuel storage tank as is indicated by the amount of gaseous fuel that is stored in the gaseous fuel tank decreasing. The battery SOC increases via the engine charging the battery or via regenerative braking (not shown). The gaseous fuel storage tank is not cooled and the gaseous fuel tank is not filled during this time interval.

At time t3, the fuel filling nozzle is inserted into the vehicle's fuel receiver and the gaseous fuel storage tank filling state changes from a low level to a high level to indicate that the gaseous fuel tank is being filled with fuel. Because the battery SOC is greater than threshold 450 and ambient air temperature is just above 70° F. (not shown), cooling of the gaseous fuel tank is initiated as is indicated by the state of the gaseous fuel storage tank cooling transitioning from a low level to a high level. By cooling the gaseous fuel storage tank during refilling, the amount of gas that may be stored in the gaseous fuel storage tank may be increased as compared to if the gaseous fuel tank were not cooled. Further, cooling the gaseous fuel storage tank may reduce the temperature increase of fuel within the gaseous fuel storage tank that is due to work performed compressing the fuel in the gaseous fuel storage tank. The amount of gaseous fuel stored in the gaseous fuel storage tank begins to increase. Between time t3 and time t4, the amount of fuel stored in the gaseous fuel storage tank increases and the gaseous fuel tank is cooled via a cooling system. In one example, the gaseous fuel storage tank may be cooled via a vapor compression heat pump as is shown in FIG. 3A. In another example, the gaseous fuel storage tank may be cooled via a liquid cooling system as is shown in FIG. 3B.

Just before time t4, pressure in the gaseous fuel storage tank reaches a threshold pressure (not shown) and the fuel refilling station automatically ceases to supply fuel to the gaseous fuel storage tank. The amount of fuel stored in the gaseous fuel tank reaches a level of A2. The state of gaseous fuel storage tank cooling remains asserted to indicate that the gaseous fuel storage tank is being cooled. At time t4, the fuel filling nozzle is removed from the vehicle and the gaseous fuel storage tank filling state changes from a high level to a low level to indicate that the gaseous fuel storage tank is no longer being filled. Further, the state of the gaseous fuel storage tank cooling is transitioned from a high level to a low level to indicate that the gaseous fuel storage tank is no longer being cooled. The amount of fuel stored A2 is greater than the amount of fuel stored A1 when the gaseous fuel tank was not cooled because of the low battery SOC. The temperature of fuel stored in the gaseous fuel storage tank gradually changes to ambient temperature (not shown).

In this way, cooling of a gaseous fuel storage tank may be allowed or prevented in response to battery SOC. Further, if ambient conditions are cold and the gaseous fuel storage tank is cold at the time of refilling, gaseous fuel storage tank cooling may be prevented to conserve battery charge.

Referring now to FIG. 5, a method for operating a vehicle that includes a fuel storage tank is shown. The method of FIG. 5 may selectively cool a fuel tank during filling of the fuel tank so as to provide more consistent amounts of fuel stored in the fuel tank after fuel tank filling. The fuel tank may be cooled via a vapor compression heat pump or via a liquid cooling loop. At least portions of method 500 may be included in the system of FIGS. 1A-3B as executable instructions stored in non-transitory memory of a controller. Further, portions of the method of FIG. 5 may be actions taken in the physical world by a controller in cooperation with the sensors and actuators shown in the system described in FIGS. 1A-3B.

At 502, method 500 judges if a gaseous fuel filling nozzle is inserted into a vehicle's gaseous fuel receiver. A sensor may indicate the presence or absence of a gaseous filling nozzle inserted into the vehicle's gaseous fuel receiver, and the controller (e.g., one of the controllers described herein, such as vehicle system controller 255) may determine that gaseous fuel filling is being performed according to output of the sensor. If method 500 determines that the gaseous fuel filling nozzle is installed and gaseous fuel filling is in progress, the answer is yes and method 500 proceeds to 504.

Otherwise, the answer is no and method 500 proceeds to 520.

At 520, method 500 ceases cooling of the gaseous fuel storage tank if the gaseous fuel storage tank is being cooled. In one example, where the gaseous fuel storage tank is cooled via a vapor compression heat pump (e.g., 332 of FIG. 3A), method 500 may change a position of valve 315 to direct coolant from battery chiller heat exchanger 336 to electric energy storage device 131 so as to bypass coolant from flowing to gaseous fuel storage tank 133. Further, if a temperature of electric energy storage device 131 is less than a threshold, method 500 may cease supplying pump 324 electrical energy from electric energy storage device 131. In addition, if cooling of passenger cabin 302 is not requested, compressor 360 may be deactivated via ceasing to supply electrical power to compressor 360 from electric energy storage device 131. Thus, the heat pump may be deactivated via deactivating compressor 360 and/or a battery circuit cooling pump 324 may be deactivated in response to ceasing to fill the gaseous fuel storage tank.

In another example, method 500 where the gaseous fuel storage tank is cooled via liquid to air heat exchanger in a battery coolant circuit (e.g., 397 of FIG. 3B), method 500 may change a position of valve 334 to direct coolant from battery radiator 338 or bypass valve 346 to electric energy storage device 131 so as to bypass coolant from flowing to gaseous fuel storage tank 133. Further, if a temperature of electric energy storage device 131 is less than a threshold, method 500 may cease supplying pump 333 electrical energy from electric energy storage device 131. Thus, the pump 333 of liquid to air heat exchanger battery coolant circuit 397 may be deactivated in response to ceasing to fill the gaseous fuel storage tank. Cooling of gaseous fuel storage tank 133 ceases after coolant flow through the liquid to air heat exchanger battery coolant circuit 397 is stopped. Method 500 proceeds to exit after ceasing cooling of the gaseous fuel storage tank.

At 504, method 500 judges if the vehicle's fuel tank is being filled via a fuel station in a time fill mode. Method 500 may determine if the vehicle's gaseous fuel storage tank is being filled in a time fill mode from data delivered to the vehicle via the filling station. If method 500 determines that the vehicle is receiving fuel in a time fill mode, the answer is yes and method 500 proceeds to 520. Otherwise, the answer is no, method 500 determines that the gaseous fuel storage tank is being filled in a fast fill mode, and method 500 proceeds to 508.

At 508, method 500 judges if ambient air temperature is greater than a threshold temperature (e.g., 70° F.). In one example, the threshold temperature is a temperature for which the pressure rating of the gaseous fuel storage tank is determined. If method 500 judges that ambient air temperature is greater than the threshold temperature, then the answer is yes and method 500 proceeds to 530. Otherwise, method 500 determines that ambient temperature is less than the threshold temperature, the answer is no, and method 500 proceeds to 510.

At 510, method 500 judges if SOC of the traction battery is less than a threshold value (e.g., 35%). Method 500 may determine battery SOC via battery voltage and coulomb counting. When method 500 determines that battery SOC is less than the threshold, the answer is yes and method 500 proceeds to 522. When method 500 determines that the battery SOC is not less than the threshold, the answer is no and method 500 proceeds to 512.

At 522, method 500 inhibits cooling of the gaseous fuel storage tank via the battery cooling system (e.g., 335 or 397) and notifies vehicle occupants that the amount of fuel stored in the gaseous fuel storage tank may be reduced amount. The vehicle occupants may be notified via a human/machine interface. Cooling of the gaseous fuel storage tank may be inhibited by changing a position of valve 315 to direct coolant from battery chiller heat exchanger 336 to electric energy storage device 131 so as to bypass coolant from flowing to gaseous fuel storage tank 133 when the vehicle includes a heat pump. Further, if a temperature of electric energy storage device 131 is less than a threshold, method 500 may cease supplying pump 324 electrical energy from electric energy storage device 131. In addition, if cooling of passenger cabin 302 is not requested, compressor 360 may be deactivated via ceasing to supply electrical power to compressor 360 from electric energy storage device 131. Thus, the heat pump may be deactivated via deactivating compressor 360 and/or a battery circuit cooling pump 324 may be deactivated to inhibit cooling of the gaseous fuel storage tank.

In another example, cooling of the gaseous fuel storage tank may be inhibited by changing a position of valve 334 to direct coolant from battery radiator 338 or bypass valve 346 to electric energy storage device 131 so as to bypass coolant from flowing to gaseous fuel storage tank 133 when the fuel tank is cooled via a radiator. Further, if a temperature of electric energy storage device 131 is less than a threshold, method 500 may cease supplying pump 333 electrical energy from electric energy storage device 131. Thus, the pump 333 of liquid to air heat exchanger battery coolant circuit 397 may be deactivated in response to inhibiting cooling of the gaseous fuel storage tank. Method 500 proceeds to exit after inhibiting cooling of the gaseous fuel storage tank.

At 512, method 500 judges if the refueling station (e.g., 5 in FIG. 1A) gas pressure is less than a rated pressure of the gaseous fuel storage tank of the vehicle. In one example, the rated pressure of the gaseous fuel storage tank is a continuous pressure level within the gaseous fuel storage tank that is not to be exceeded at a predefined ambient temperature (e.g., 70° F.). Method 500 may make the judgement from data sent to vehicle 1 via the refueling station 5. If method 500 determines that refueling station gas pressure is less than the rated pressure of the gaseous fuel storage tank of the vehicle, the answer is yes and method 500 proceeds to 514. Otherwise, method 500 determines that refueling station gas pressure is not greater than the rated pressure of the gaseous fuel storage tank of the vehicle, the answer is no and method 500 proceeds to 516.

At 514, method 500 commands the cooling system to cool the gaseous fuel storage tank to a first threshold temperature that is less than ambient temperature, but the gaseous fuel storage tank is not cooled to a temperature that, when the gaseous fuel storage tank is warmed to ambient temperature over time, the gas pressure in the gaseous fuel storage tank exceeds the rated pressure of the gaseous fuel storage tank. In other words, the gaseous fuel storage tank is not cooled to a temperature that allows pressure in the gaseous fuel tank to exceed the gaseous fuel storage tanks rated pressure when the gaseous fuel storage tank reaches ambient temperature. Further, the electric energy storage device 131 is not heated via the gaseous fuel storage tank. For example, if ambient temperature is 85° F., the battery cooling system may be commanded to cool the gaseous fuel storage tank to 75° F., where pressure in the gaseous fuel storage temperature at ambient temperature is less than the rated pressure (e.g., not to exceed pressure) of the gaseous fuel storage tank. By cooling the gaseous fuel storage tank, the amount of fuel stored in the gaseous fuel tank may be increased because it may take a larger amount of fuel in the gaseous fuel storage tank to reach a pressure at which the fuel refilling station stops delivering fuel to the gaseous fuel storage tank.

Method 500 begins cooling of the gaseous fuel storage tank. In one example, where the gaseous fuel storage tank is cooled via a vapor compression heat pump (e.g., FIG. 3A), method 500 may change a position of valve 315 to direct coolant from battery chiller heat exchanger 336 to the gaseous fuel storage tank 133 so as to cool the gaseous fuel storage tank 131 via coolant that has been cooled by the heat pump subsystem 332. Further, method 500 supplies pump 324 with electrical energy from electric energy storage device 131. In addition, compressor 360 is activated by supplying electrical power to compressor 360 from electric energy storage device 131. The heat pump subsystem 332 is operated in a cooling mode.

In another example, where the gaseous fuel storage tank may be cooled via liquid to air heat exchanger in a battery coolant circuit (e.g., FIG. 3B), method 500 may change a position of valve 334 to direct coolant from battery radiator 338 or bypass valve 346 to gaseous fuel storage tank 133. Further, method 500 supplies pump 333 with electrical energy from electric energy storage device 131. Thus, the pump 333 of liquid to air heat exchanger battery coolant circuit 397 may be activated in response to filling the gaseous fuel storage tank. The gaseous fuel storage tank may be cooled until refueling of the gaseous fuel storage tank ceases. Method 500 proceeds to exit.

At 516, method 500 commands the system to cool the gaseous fuel storage tank to a second threshold temperature that is equal to or greater than ambient temperature. Further, the electric energy storage device 131 is not heated via the gaseous fuel storage tank. For example, if ambient temperature is 85° F., the battery cooling system may be commanded to cool the gaseous fuel storage tank to 86° F. By cooling the gaseous fuel storage tank, the amount of fuel stored in the gaseous fuel tank may be increased because it may take a larger amount of fuel in the gaseous fuel storage tank to reach a pressure at which the fuel refilling station stops delivering fuel to the gaseous fuel storage tank.

In one example, method 500 begins cooling of the gaseous fuel storage tank. In one example, where the gaseous fuel storage tank is cooled via a vapor compression heat pump (e.g., FIG. 3A), method 500 may change a position of valve 315 to direct coolant from battery chiller heat exchanger 336 to the gaseous fuel storage tank 133 so as to cool the gaseous fuel storage tank via coolant that has been cooled by the heat pump subsystem 332. Further, method 500 supplies pump 324 with electrical energy from electric energy storage device 131. In addition, compressor 360 is activated by supplying electrical power to compressor 360 from electric energy storage device 131. The heat pump subsystem 332 is operated in a cooling mode.

In another example, where the gaseous fuel storage tank may be cooled via liquid to air heat exchanger in a battery coolant circuit (e.g., FIG. 3B), method 500 may change a position of valve 334 to direct coolant from battery radiator 338 or bypass valve 346 to gaseous fuel storage tank 133. Further, method 500 supplies pump 333 with electrical energy from electric energy storage device 131. Thus, the pump 333 of liquid to air heat exchanger battery coolant circuit 397 may be activated in response to filling the gaseous fuel storage tank. The gaseous fuel storage tank may be cooled until refueling of the gaseous fuel storage tank ceases. Method 500 proceeds to exit.

At 530, method 500 judges if SOC of the traction battery is less than a threshold value (e.g., 35%). Method 500 may determine battery SOC via battery voltage and coulomb counting. When method 500 determines that battery SOC is less than the threshold, the answer is yes and method 500 proceeds to 538. When method 500 determines that battery SOC is not less than the threshold, the answer is no and method 500 proceeds to 532.

At 538, method 500 inhibits cooling of the gaseous fuel storage tank via the battery cooling system (e.g., 335 or 397) and notifies vehicle occupants that the amount of fuel stored in the gaseous fuel storage tank may be reduced amount. The vehicle occupants may be notified via a human/machine interface. Cooling of the gaseous fuel storage tank may be inhibited by changing a position of valve 315 to direct coolant from battery chiller heat exchanger 336 to electric energy storage device 131 so as to bypass coolant from flowing to gaseous fuel storage tank 133 when the vehicle includes a heat pump. Further, if a temperature of electric energy storage device 131 is less than a threshold, method 500 may cease supplying pump 324 electrical energy from electric energy storage device 131. In addition, if cooling of passenger cabin 302 is not requested, compressor 360 may be deactivated via ceasing to supply electrical power to compressor 360 from electric energy storage device 131. Thus, the heat pump may be deactivated via deactivating compressor 360 and/or a battery circuit cooling pump 324 may be deactivated to inhibit cooling of the gaseous fuel storage tank.

In another example, cooling of the gaseous fuel storage tank may be inhibited by changing a position of valve 334 to direct coolant from battery radiator 338 or bypass valve 346 to electric energy storage device 131 so as to bypass coolant from flowing to gaseous fuel storage tank 133 when the fuel tank is cooled via a radiator. Further, if a temperature of electric energy storage device 131 is less than a threshold, method 500 may cease supplying pump 333 electrical energy from electric energy storage device 131. Thus, the pump 333 of liquid to air heat exchanger battery coolant circuit 397 may be deactivated in response to inhibiting cooling of the gaseous fuel storage tank. Method 500 proceeds to exit after inhibiting cooling of the gaseous fuel storage tank.

At 532, method 500 judges if the refueling station (e.g., 5 in FIG. 1A) gas pressure is less than a rated pressure of the gaseous fuel storage tank of the vehicle. In one example, the rated pressure of the gaseous fuel storage tank is a continuous pressure level within the gaseous fuel storage tank that is not to be exceeded at a predefined ambient temperature (e.g., 70° F.). Method 500 may make the judgement from data sent to vehicle 1 via the refueling station 5. If method 500 determines that refueling station gas pressure is less than the rated pressure of the gaseous fuel storage tank of the vehicle, the answer is yes and method 500 proceeds to 534. Otherwise, method 500 determines that refueling station gas pressure is not less than the rated pressure of the gaseous fuel storage tank of the vehicle, the answer is no and method 500 proceeds to 536.

At 534, method 500 commands the system to cool the gaseous fuel storage tank to a third threshold temperature that is less than ambient temperature, but the gaseous fuel storage tank is not cooled to a temperature that, when the gaseous fuel storage tank is warmed to ambient temperature over time, the gas pressure in the gaseous fuel storage tank exceeds the rated pressure of the gaseous fuel storage tank.

In other words, the gaseous fuel storage tank is not cooled to a temperature that allows pressure in the gaseous fuel tank to exceed the gaseous fuel storage tanks rated pressure when the gaseous fuel storage tank reaches ambient temperature. Further, the electric energy storage device 131 is heated via heat from the gaseous fuel storage tank. For example, if ambient temperature is 86° F., the battery cooling system may be commanded to cool the gaseous fuel storage tank to 76° F., where pressure in the gaseous fuel storage temperature at ambient temperature is less than the rated pressure (e.g., not to exceed pressure) of the gaseous fuel storage tank. By cooling the gaseous fuel storage tank, the amount of fuel stored in the gaseous fuel tank may be increased because it may take a larger amount of fuel in the gaseous fuel storage tank to reach a pressure at which the fuel refilling station stops delivering fuel to the gaseous fuel storage tank.

In one example, where the gaseous fuel storage tank is cooled via a vapor compression heat pump (e.g., FIG. 3A), method 500 may change a position of valve 315 to direct coolant from battery chiller heat exchanger 336 to the gaseous fuel storage tank 133 so as to cool the gaseous fuel storage tank via coolant that has been cooled by the heat pump subsystem 332. Further, method 500 supplies pump 324 with electrical energy from electric energy storage device 131. In addition, compressor 360 is activated by supplying electrical power to compressor 360 from electric energy storage device 131. The heat pump subsystem 332 is operated in a cooling mode.

In another example, where the gaseous fuel storage tank may be cooled via liquid to air heat exchanger in a battery coolant circuit (e.g., FIG. 3B), method 500 may change a position of valve 334 to direct coolant from battery radiator 338 or bypass valve 346 to gaseous fuel storage tank 133. Further, method 500 supplies pump 333 with electrical energy from electric energy storage device 131. Thus, the pump 333 of liquid to air heat exchanger battery coolant circuit 397 may be activated in response to filling the gaseous fuel storage tank. The gaseous fuel storage tank may be cooled until refueling of the gaseous fuel storage tank ceases. Method 500 proceeds to exit.

At 536, method 500 commands the system to cool the gaseous fuel storage tank to a fourth threshold temperature that is equal to or greater than ambient temperature. Further, the electric energy storage device 131 is not heated via the gaseous fuel storage tank. For example, if ambient temperature is 87° F., the battery cooling system may be commanded to cool the gaseous fuel storage tank to 89° F. By cooling the gaseous fuel storage tank, the amount of fuel stored in the gaseous fuel tank may be increased because it may take a larger amount of fuel in the gaseous fuel storage tank to reach a pressure at which the fuel refilling station stops delivering fuel to the gaseous fuel storage tank.

In one example, method 500 begins cooling of the gaseous fuel storage tank. In one example, where the gaseous fuel storage tank is cooled via a vapor compression heat pump (e.g., FIG. 3A), method 500 may change a position of valve 315 to direct coolant from battery chiller heat exchanger 336 to the gaseous fuel storage tank 133 so as to cool the gaseous fuel storage tank via coolant that has been cooled by the heat pump subsystem 332. Further, method 500 supplies pump 324 with electrical energy from electric energy storage device 131. In addition, compressor 360 is activated by supplying electrical power to compressor 360 from electric energy storage device 131. Valve 325 is positioned to direct coolant from gaseous fuel storage tank to electric energy storage device 131 so as to heat electric energy storage device 131 using heat (e.g., heat of compression) from the gaseous fuel storage tank.

In another example, where the gaseous fuel storage tank may be cooled via liquid to air heat exchanger in a battery coolant circuit (e.g., FIG. 3B), method 500 may change a position of valve 334 to direct coolant from battery radiator 338 or bypass valve 346 to gaseous fuel storage tank 133. Further, method 500 supplies pump 333 with electrical energy from electric energy storage device 131. Thus, the pump 333 of liquid to air heat exchanger battery coolant circuit 397 may be activated in response to filling the gaseous fuel storage tank. The gaseous fuel storage tank may be cooled until refueling of the gaseous fuel storage tank ceases. Valve 349 is positioned to direct coolant from gaseous fuel storage tank to electric energy storage device 131 so as to heat electric energy storage device 131 using heat (e.g., heat of compression) from the gaseous fuel storage tank. Method 500 proceeds to exit.

In this way, a heat pump and a battery chiller circuit may cool a gaseous fuel storage tank to increase an amount of fuel that may be stored in a gaseous fuel storage tank at or below a rated pressure of the gaseous fuel storage tank. Further, a coolant to air radiator may cool a gaseous fuel storage tank to increase an amount of fuel that may be stored in a gaseous fuel storage tank at or below a rated pressure of the gaseous fuel storage tank. Further, the vehicle's battery may be heated by way of heat of compression via the gaseous fuel storage tank during filling of the gaseous fuel storage tank. By heating the battery via heat provided by the gaseous fuel storage tank, electrical energy of the battery may be conserved.

The method of FIG. 5 provides for a vehicle operating method, comprising: cooling a gaseous fuel storage tank that is in fluidic communication with an internal combustion engine via a controller and a cooling circuit that is included in a vehicle in response to filling the gaseous fuel tank with fuel. The vehicle operating method includes where the cooling circuit includes a vapor compression heat pump. The vehicle operating method further comprises heating an electric energy storage device in response to filling the gaseous fuel tank with fuel. The vehicle operating method further comprises supplying electrical power to a compressor or pump located within the cooling circuit via the electric energy storage device. The vehicle operating method includes where heating the electric energy storage device includes transferring heat from the gaseous fuel tank to the electric energy storage device via the cooling circuit.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other system hardware.

This concludes the description. The reading of it by those skilled in the art would bring to mind many alterations and modifications without departing from the spirit and the scope of the description. For example, the systems and methods described herein may be applied to full electric vehicles and vehicles that include an engine and an electric motor for propulsion.

The invention claimed is:

1. A vehicle system, comprising:
a cooling circuit including a pump or compressor;
a gaseous fuel storage tank in thermal communication with the cooling circuit; and
a controller including executable instructions stored in non-transitory memory to cool the gaseous fuel storage tank via the cooling circuit in response to filling of the gaseous fuel storage tank with a gaseous fuel,
wherein the cooling of the gaseous fuel storage tank reduces a temperature increase of the gaseous fuel.

2. The vehicle system of claim 1, further comprising determining that the gaseous fuel storage tank is being filled via the controller.

3. The vehicle system of claim 1, where the cooling circuit includes a heat pump.

4. The vehicle system of claim 1, where the cooling circuit includes a radiator and a liquid coolant.

5. The vehicle system of claim 1, further comprising an electric energy storage device that is selectively electrically coupled to the pump or compressor.

6. The vehicle system of claim 5, further comprising an electric machine that provides propulsive torque to a vehicle, the electric machine in electrical communication with the electric energy storage device.

7. The vehicle system of claim 5, where the cooling circuit is in thermal communication with the electric energy storage device.

8. The vehicle system of claim 5, further comprising a three-way valve that is configured to pass coolant through a portion of the cooling circuit that cools the gaseous fuel storage tank and to bypass coolant around the portion of the cooling circuit that cools the gaseous fuel storage tank.

9. The vehicle system of claim 1, where, if a filling station pressure is less than a rated pressure of the gaseous fuel storage tank, the gaseous fuel storage tank is cooled to a temperature below an ambient temperature and above a temperature that, when the gaseous fuel storage tank is warmed to ambient temperature over time, a gas pressure in the gaseous fuel storage tank will exceed a rated pressure of the gaseous fuel storage tank; and
where, if the filling station pressure is not less than the rated pressure of the gaseous fuel storage tank, the gaseous fuel storage tank is cooled to a temperature greater than or equal to the ambient temperature.

10. A vehicle system, comprising:
a cooling circuit including a pump or compressor;
a battery in selective electrical communication with the pump or compressor;
a gaseous fuel tank in thermal communication with the cooling circuit; and
a controller including executable instructions stored in non-transitory memory to cool the gaseous fuel tank via the cooling circuit below an ambient temperature in response to filling of the gaseous fuel tank when a filling station pressure is less than a rated pressure of the gaseous fuel tank and further responsive to ambient temperature relative to a threshold, further comprising additional instructions to activate the pump or compressor via electrical power provided by the battery, and to heat the battery via heat extracted from the gaseous fuel tank.

11. The vehicle system of claim 10, further comprising additional instructions to cool the gaseous fuel tank via the cooling circuit to a temperature not less than ambient temperature in response to filling the gaseous fuel tank when the filling station pressure is greater than the rated pressure of the gaseous fuel tank.

12. The vehicle system of claim 10, further comprising a heat exchanger included in the cooling circuit.

13. The vehicle system of claim 12, where the cooling circuit includes glycol coolant and further comprising a vapor compression heat pump that is in thermal communication with the cooling circuit.

14. The vehicle system of claim 10, where, if the gaseous fuel tank is cooled done when the filling station pressure is less than the rated pressure of the gaseous fuel tank, the gaseous fuel tank is additionally cooled to a temperature above a temperature that, when the gaseous fuel tank is warmed to ambient temperature over time, a gas pressure in the gaseous fuel tank will exceed a rated pressure of the gaseous fuel tank.

15. A vehicle operating method, comprising:
cooling a gaseous fuel storage tank that is in fluidic communication with an internal combustion engine via a controller and a cooling circuit that is included in a vehicle in response to filling the gaseous fuel storage tank with fuel; and
heating an electric energy storage device in response to filling the gaseous fuel storage tank with fuel, where heating the electric energy storage device includes transferring heat from the gaseous fuel storage tank to the electric energy storage device via the cooling circuit.

16. The vehicle operating method of claim 15, where the cooling circuit includes a vapor compression heat pump.

17. The vehicle operating method of claim 15, further comprising supplying electrical power to a compressor or pump located within the cooling circuit via the electric energy storage device.

* * * * *